H. M. WALKER.
Dray.

No 28,796.

Patented June 19, 1860.

Witnesses;

Inventor;
H. M. Walker

UNITED STATES PATENT OFFICE.

H. M. WALKER, OF WATERTOWN, CONNECTICUT.

CONNECTING SHAFTS TO TWO-WHEELED VEHICLES.

Specification of Letters Patent No. 28,796, dated June 19, 1860.

*To all whom it may concern:*

Be it known that I, H. M. WALKER, of Watertown, in the county of Litchfield and State of Connecticut, have invented a new and useful Improvement in Two-Wheeled Vehicles; and I do hereby declare that the following is a full, clear, and exact description thereof, reference being had to the accompanying drawings, forming a part of this specification, in which—

Figure 1:
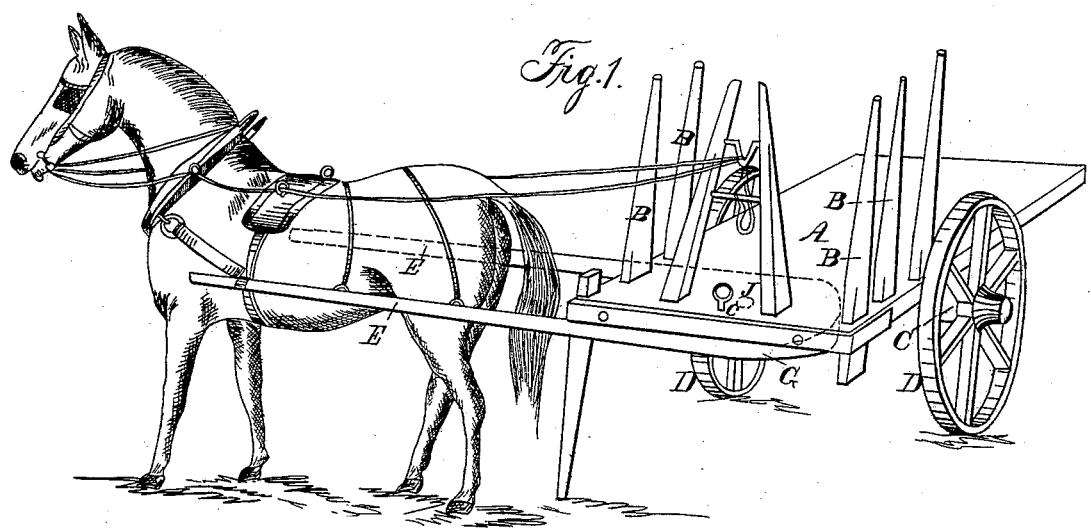
Figure 2:
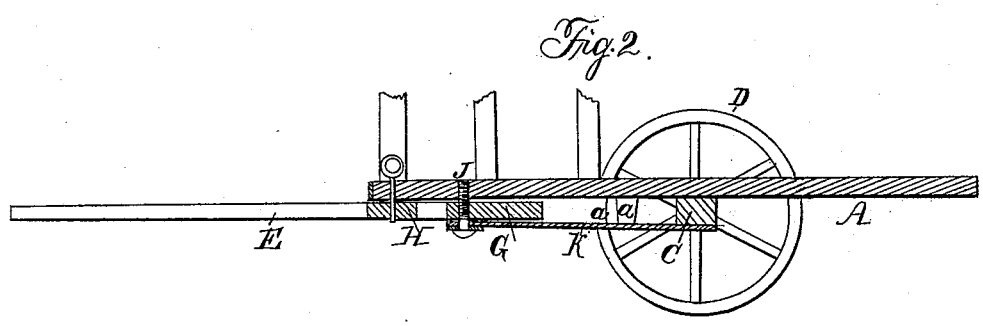

Figure 1, represents a perspective view of an ordinary dray or street cart, showing my improvement attached to it, and the operation of the same. Fig. 2, is a vertical longitudinal section taken through the dray showing my manner of attaching the shafts.

Similar letters of reference indicate corresponding parts in both figures.

The object of my invention is to remedy a serious objection to the two wheel vehicles that are used for transporting boxes of goods, bales, barrels, and other like articles of a heavy and unwieldy character about our streets from place to place. The drays, as distinguished from carts, have no side boards, nor tail board, and they are much lower than carts, so that when loading or unloading them they are backed up on the curb, when the lower end of the floor or bottom will rest on, or nearly touch the pavement, they can thus be loaded or have their load removed very rapidly and without much labor. These drays are constructed with their shafts running their whole length and either secured to the axle-tree directly, or to springs. An ordinary dray has no springs but consists simply of the flooring, axle-tree and two wheels. The objection to this class of vehicle is, that in narrow streets or even wide streets that are great thoroughfares, they are frequently in the way, to the inconvenience and hindrance of travel; and frequently in narrow streets a dray will completely stop up the street until the load can be removed and the horse turned around. Instances of this kind occur so very frequently that a practical remedy is a great desideratum.

To these ends my invention consists in constructing the platform and shafts of the dray separately, and in connecting the shafts to the platform in a novel manner and in such a manner that they may be turned at right angles to the platform when the horse is hitched up thereto, and keyed or locked in this state, when loading or unloading the dray, and when it is desired to start the horse the shafts may be brought back to their original position properly secured and made to serve every purpose of the present stiff shafts as will be hereinafter described and represented.

To enable those skilled in the art to fully understand my invention, I will proceed to describe its construction and operation.

In the drawings, A, represents the platform made up in the usual manner and provided with rung holes for receiving the cart rungs B, B. This platform is secured at about the middle of its length to axle-tree C, mounted on the two wheels D, D.

E, E, are the shafts that are connected together at their rear ends by a semicircular piece G, and a transverse bar H. The shafts should necessarily be connected together very strong and substantial and to insure greater strength they may be shod with iron bands in any suitable manner. These shafts are then connected to the platform A, by a bolt J, that passes through the ironing K, which is a strong plate secured to the axle-tree and strengthened at an intermediate point between the axle and its junction with the shafts by blocks *a*, *a*. This iron plate K, should be quite wide, so as to give a firm bearing support to the two shafts. This connection of the shafts should be such as to allow them to be swung round at right angles to the platform A, in the manner shown in Fig. 2. The shafts should then be secured in a line with the platform A, by a loose pin *c* that passes down through the front end of the platform and through the cross piece H, and this, and this pin with two side rungs that pass through the platform on each side of the shafts will keep in a rigidly fixed position and give all the strength required for ordinary purposes.

Now from this description it will be understood that by simply withdrawing the pin *c*, and the two side rungs, one of which may be used as a prop stick as represented in Fig. 1, the horse with the shafts may be turned round at right angles to the platform. The pin *c*, may now be again inserted through its hole in the platform and the shafts will be kept in this out of the way state while the dray is being loaded or unloaded.

I do not wish to claim broadly the principle of hanging shafts of vehicles in such a manner that the horse may be turned at right angles to the body of the vehicle or parallel with the axles thereof, for this is instanced in almost all four-wheel vehicles in which the main object of thus turning the shafts is to give a facility in guiding and turning the vehicles; but What I do claim as new, and desire to secure by Letters Patent, is—

The manner herein essentially described of attaching the shafts to two-wheel vehicles whereby said shafts may be operated in the manner and for the purposes herein set forth.

H. M. WALKER.

Witnesses:
M. M. LIVINGSTON,
WM. THOMPSON.